(12) United States Patent
Mergen et al.

(10) Patent No.: US 8,711,994 B2
(45) Date of Patent: *Apr. 29, 2014

(54) METHODS FOR DETERMINING DECODING ORDER IN A MIMO SYSTEM WITH SUCCESSIVE INTERFERENCE CANCELLATION

(71) Applicant: QUALCOMM Incorporated, San Diego, CA (US)

(72) Inventors: Gokhan Mergen, San Jose, CA (US); Subramanya P. Rao, Cupertino, CA (US); Jonathan Sidi, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/719,210

(22) Filed: Dec. 18, 2012

(65) Prior Publication Data
US 2013/0128940 A1 May 23, 2013

Related U.S. Application Data

(63) Continuation of application No. 12/547,922, filed on Aug. 26, 2009, now Pat. No. 8,335,286.

(51) Int. Cl.
*H04B 1/10* (2006.01)

(52) U.S. Cl.
USPC ............ 375/350; 375/148; 375/346; 375/349

(58) Field of Classification Search
USPC ......... 375/130, 140–144, 147–149, 316, 340, 375/343, 346, 349–350
See application file for complete search history.

(56) References Cited

U.S. PATENT DOCUMENTS

| 6,404,760 | B1 | 6/2002 | Holtzman et al. |
| 6,801,580 | B2 | 10/2004 | Kadous |
| 6,917,821 | B2 * | 7/2005 | Kadous et al. ............. 455/562.1 |
| 7,480,341 | B2 | 1/2009 | Jeong et al. |
| 8,130,820 | B2 | 3/2012 | Kim et al. |
| 8,170,141 | B2 | 5/2012 | Futatsugi et al. |
| 8,335,286 | B2 * | 12/2012 | Mergen et al. ............... 375/350 |
| 8,358,714 | B2 | 1/2013 | Walton et al. |
| 2003/0125040 | A1 | 7/2003 | Walton et al. |
| 2003/0189999 | A1 * | 10/2003 | Kadous ........................ 375/349 |

(Continued)

FOREIGN PATENT DOCUMENTS

| EP | 2192710 | 6/2010 |
| JP | 2008547284 A | 12/2008 |

(Continued)

OTHER PUBLICATIONS

International Search Report and Written Opinion—PCT/US2010/045217—ISA—EPO—Oct. 29, 2010.

(Continued)

*Primary Examiner* — Sam K Ahn
*Assistant Examiner* — James M Perez
(74) *Attorney, Agent, or Firm* — Charles E. Eggers

(57) ABSTRACT

Certain aspects provide a method for determining decoding order and reconstruction weights for decoded streams to be cancelled in a MIMO system with successive interference cancellation, based on estimates of the channel characteristics, the received composite signal and parameters of the system.

19 Claims, 8 Drawing Sheets

(56) References Cited

U.S. PATENT DOCUMENTS

| | | | |
|---|---|---|---|
| 2003/0210668 A1* | 11/2003 | Malladi et al. ................. | 370/335 |
| 2004/0120299 A1* | 6/2004 | Kidiyarova-Shevchenko et al. ............................. | 370/342 |
| 2007/0104253 A1* | 5/2007 | Luo et al. ....................... | 375/148 |
| 2008/0019434 A1 | 1/2008 | Kim et al. | |
| 2011/0051832 A1 | 3/2011 | Mergen et al. | |

FOREIGN PATENT DOCUMENTS

| | | |
|---|---|---|
| WO | 03041300 A1 | 5/2003 |
| WO | 2006094141 A2 | 9/2006 |
| WO | 2008070377 | 6/2008 |
| WO | 2009038178 | 3/2009 |

OTHER PUBLICATIONS

International Search Report and Written Opinion—PCT/US2010/045221—ISA—EPO—Oct. 29, 2010.

QUALCOMM Europe, "Number of HARQ processes & DL timing" 3GPP TSG-RAN1 #39, Shin-Yokohama, Japan, Nov. 15-19, 2004, R1-041385, 4 pages.

Cha S., et al., "V-BLAST Detection Ordering Methodwith H-ARQ", Advanced Technologies for Communications, 2008, ATC 2008, International Conference on, Oct. 6, 2008.

Ohgane T., et al., "Applications of Space Division Multiplexing and Those Performance in a MIMO Channel" Transactions of IEICE, B, Communications, Japan, Sep. 1, 2004, The Institute of Electronics, Information and Communication Engineers (IEICE).

* cited by examiner

METHODS FOR DETERMINING DECODING ORDER IN A MIMO SYSTEM WITH SUCCESSIVE INTERFERENCE CANCELLATION

TECHNICAL FIELD

Certain embodiments of the present disclosure generally relate to wireless communication and, more particularly, to methods for determining decoding order and reconstruction weights in a Multiple Input Multiple Output (MIMO) system with successive interference cancellation.

BACKGROUND

Multiple Input Multiple Output (MIMO) communication is supported in wireless communications standards such as 3rd Generation Partnership Project (3GPP), Evolved High-Speed Packet Access (HSPA+), Long Term Evolution (LTE) and Worldwide Interoperability for Microwave Access (WiMAX).

A MIMO system utilizes multiple transmit and receive antennas for communication to significantly increase the throughput of the system. In a MIMO communication system, the data payload may be partitioned into a plurality of blocks that are encoded and decoded independently. For example, in the Downlink component of the HSPA+ standard, an evolution of High-Speed Downlink Packet Access (HS-DPA), MIMO communication is performed over two separately encoded blocks of data or 'streams.' Separately encoded blocks of data are also employed in LTE and The Institute of Electrical and Electronics Engineers (IEEE) 802.11 family of standards.

Successive Interference Cancellation (SIC), an optimal technique for processing multiple streams at the receiver, decodes streams of data one by one. Upon successful decoding of a stream, effects of the decoded stream are subtracted from the received composite signal to eliminate the interference of the decoded stream on the remaining streams. Therefore, the remaining streams may have a higher likelihood of successful decoding. The decoded signal may be reconstructed by re-encoding and re-modulating before subtraction from the received composite signal.

The order in which the steams are decoded has an impact on the SIC performance. In addition, scaling the reconstructed signal appropriately before interference cancellation may improve system performance. Therefore, there is a need in the art for dynamically determining the decoding order and reconstruction weights in a successive interference cancellation receiver in MIMO systems.

SUMMARY

Certain aspects provide an apparatus for wireless communications. The apparatus generally includes a processor configured to receive a composite wireless multiple input multiple output (MIMO) signal that comprises a plurality of separately encoded data streams, select a decoding order for decoding the data streams using successive interference cancellation, decode a first stream of data based on the selected decoding order, cancel the interference of the decoded stream from the received signal before decoding remaining streams, and update the decoding order of the remaining streams and continuing successive interference cancellation of the remaining streams.

Certain aspects provide an apparatus for wireless communications. The apparatus generally includes a receiver configured to receive a composite wireless multiple input multiple output (MIMO) signal that comprises a plurality of separately encoded data streams, a decoding order selector configured to select a decoding order for decoding the data streams using successive interference cancellation, a decoder configured to decode a first stream of data based on the selected decoding order, a stream subtractor configured to cancel the interference of the decoded stream from the received signal before decoding remaining streams, and wherein the decoding order selector is further configured to update the decoding order of the remaining streams and continuing successive interference cancellation of the remaining streams.

BRIEF DESCRIPTION OF THE DRAWINGS

So that the manner in which the above recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
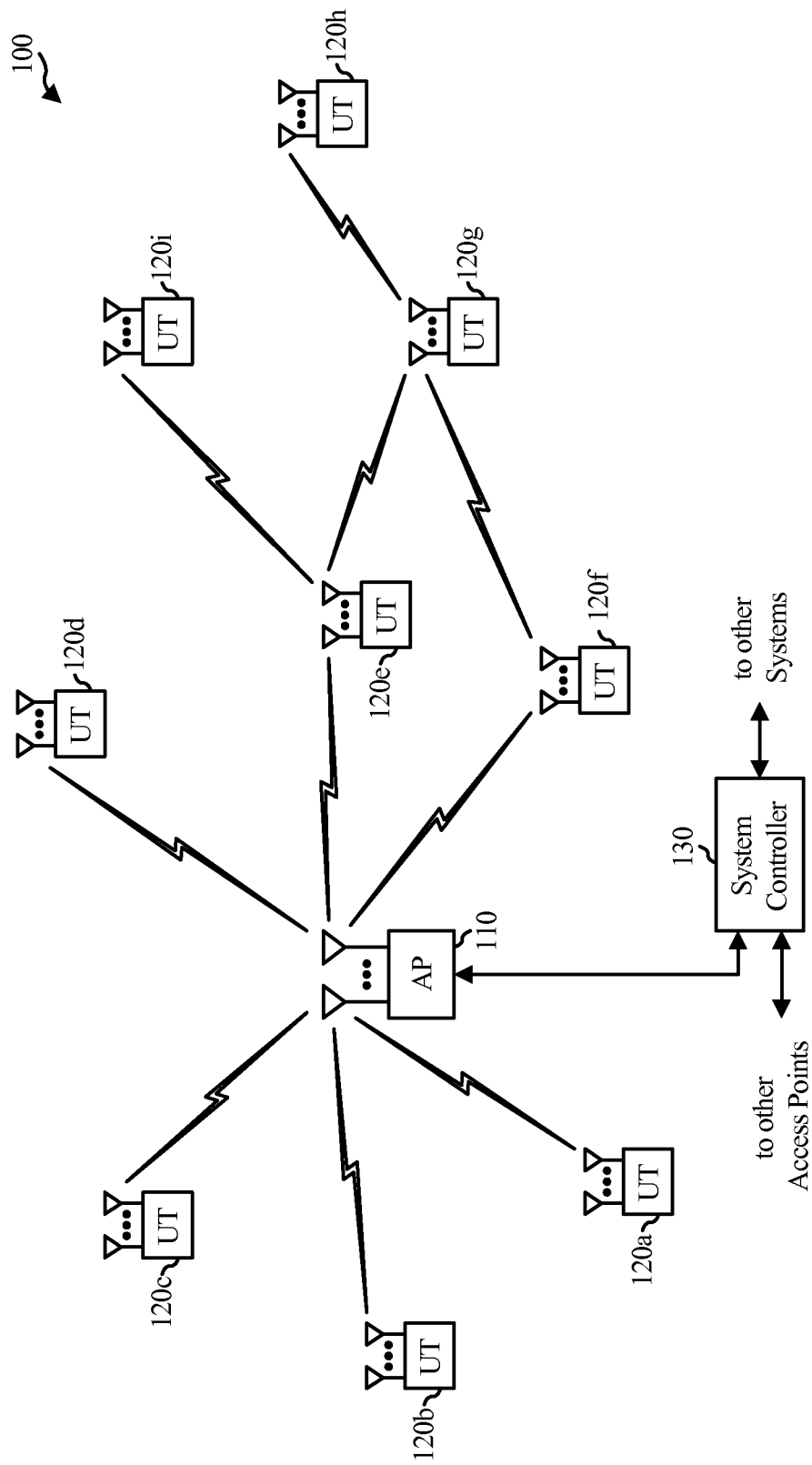
FIG. 1 illustrates a spatial division multiple access MIMO wireless system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11, LTE or some other standards. A TDMA system may implement GSM or some other standards. These various standards are known in the art.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

An Example MIMO System

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via spatial division multiple access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. For pure SDMA, it is desired to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
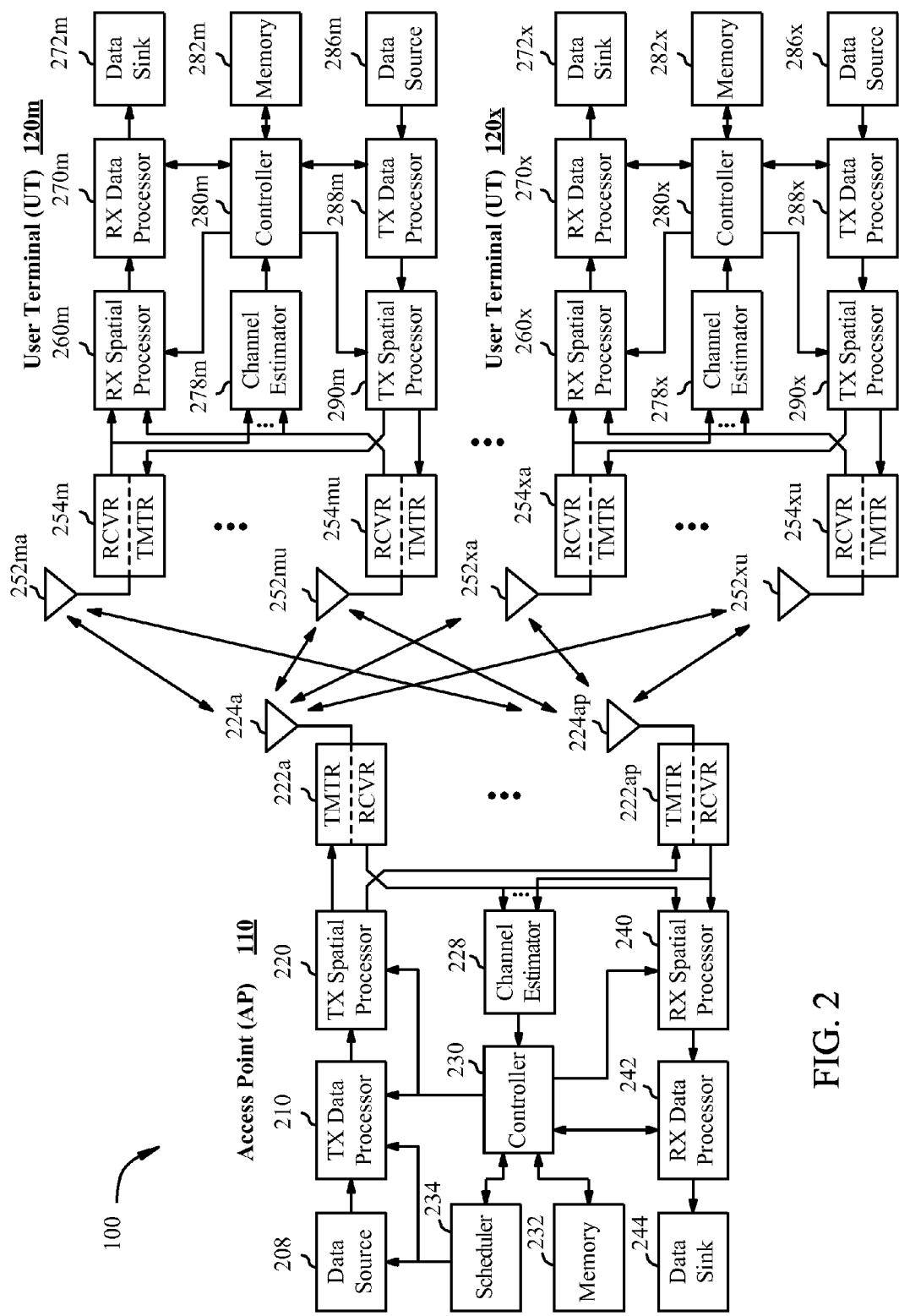
FIG. 2 illustrates a block diagram of an access point and two user terminals in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval and/or frequency. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
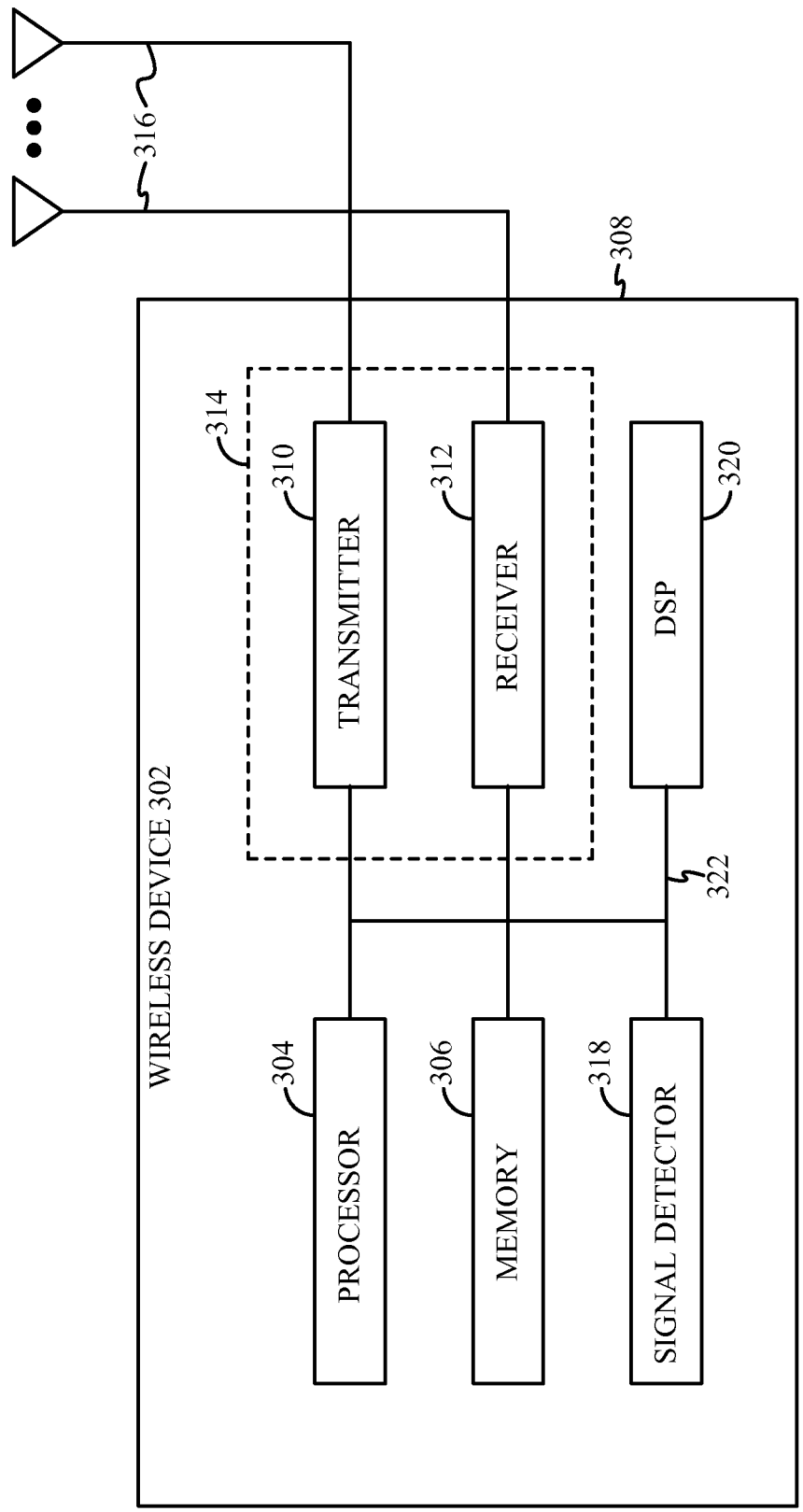
FIG. 3 illustrates example components of a wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

As used herein, the term "legacy" generally refers to wireless network nodes that support 802.11n or earlier versions of the 802.11 standard.

While certain techniques are described herein with reference to SDMA, those skilled in the art will recognize the techniques may be generally applied in systems utilizing any type of multiple access schemes, such as SDMA, OFDMA, CDMA, and combinations thereof.

Certain aspects of the present disclosure provide techniques that may help improve the performance of MIMO systems with Successive Interference Cancellation (SIC). The proposed techniques may determine the decoding order and reconstruction weights of received streams in an effort to increase the probability of successful decoding. Optimal decoding order and reconstruction weights may increase the effectiveness and robustness of MIMO SIC and improve the throughput of the system. The proposed techniques may be applicable to systems utilizing MIMO through variety of wireless standards, such as Evolved High-Speed Packet Access (HSPA+), Long Term Evolution (LTE) and IEEE 802.11 family of standards.

The techniques described in the present disclosure may be applied to different scenarios such as MIMO with or without SDMA or other type of systems. A composite received signal y(m) that contains multiple streams may be received from a single UT or multiple UTs each having a single or multiple antennas. As a result, the multiple streams may come from a single UT with multiple antennas (i.e., in MIMO), or each of the multiple streams may come from a different UT (i.e., in SDMA), or multiple streams may come from multiple antennas of each of a plurality of UTs. In general, the proposed techniques may be applied to multiple streams received from a single or multiple sources.

Figure 4:
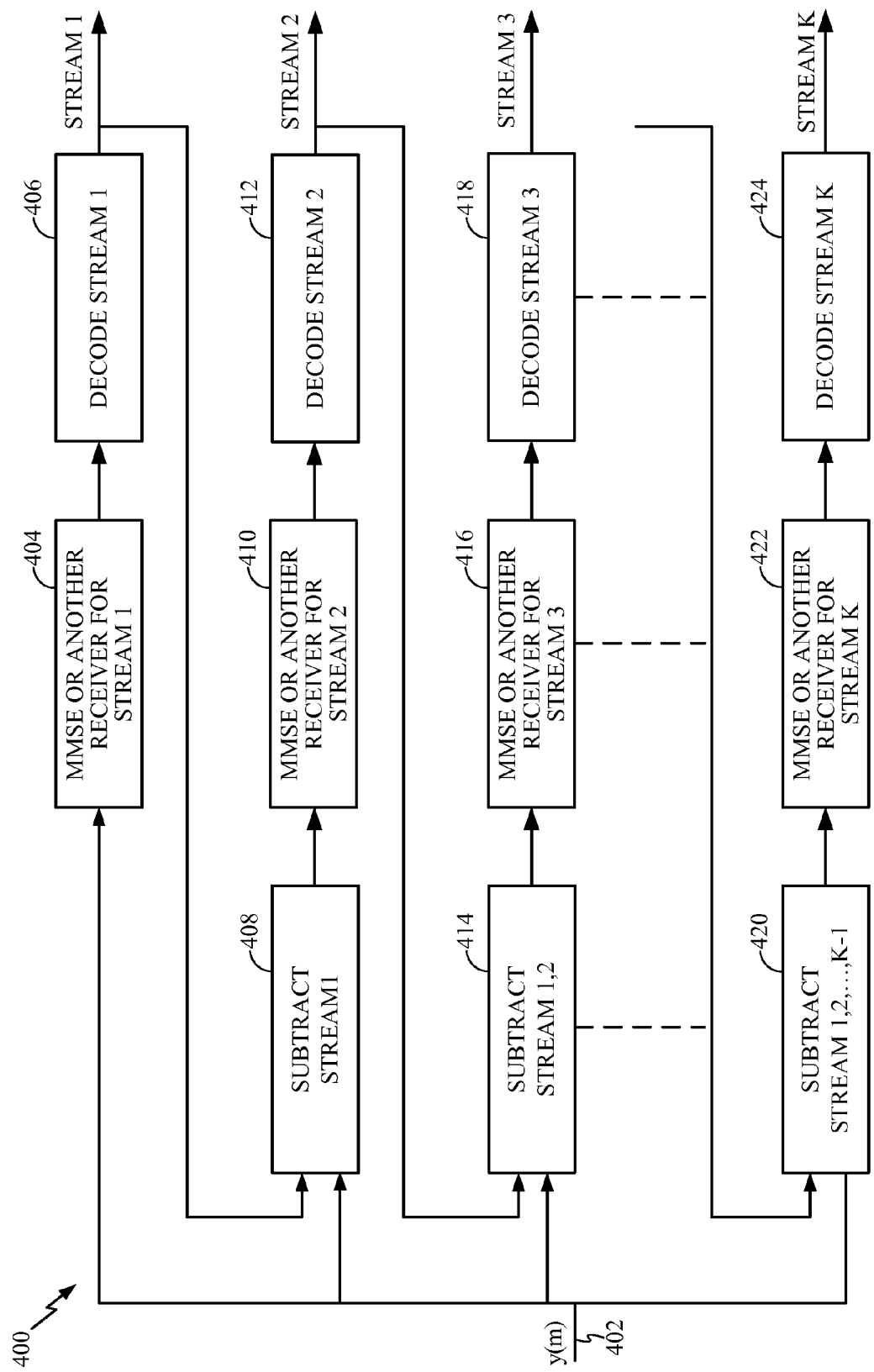
FIG. 4 illustrates an example successive interference cancellation in the receiver on a plurality of data streams, in accordance with certain aspects of the present disclosure.

FIG. 4 illustrates a MIMO receiver utilizing successive interference cancellation. A composite received signal vector y(m) 402 enters a SIC system 400 of the MIMO receiver for decoding. The composite received signal y(m) consists of a plurality of separately encoded blocks of data or 'streams.' The received signal y(m) passes through a receiver 404 for estimation and detection of the symbols of a first stream of data. The receiver may employ minimum mean square error (MMSE) or any general linear or non-linear estimator/detector. The detected symbols of the first stream enter a first channel decoder 406 for decoding. In 408, the decoded stream is subtracted from the received composite signal y(m), which passes through a second receiver 410 and a second decoder 412 to detect and decode the second stream, respectively. After decoding, both of the first and second streams of data are subtracted, at 414, from the received composite signal y(m) to decode the third stream.

The process may continue with subtraction, at 420, utilizing receiver 422 and decoder 424 until all the N streams are decoded. The decoders 406, 412 and 418 may decode any kind of error correcting code, such as turbo or convolutional codes. The decoders 406, 412 and 418 may decode a plurality of encoded streams with a plurality of types and code rates. The subtraction operation may not be performed if the decoding operation fails at any step. Each successful decode and subtract operation of the SIC system is referred to herein as one 'iteration.'

For certain embodiments of the present disclosure, at the end of some of the SIC iterations, decoding of some streams may be unsuccessful. Therefore, the process may continue with a subset of streams that have yet to be correctly decoded, by modifying the decoding order in a recursive manner. This process may continue until a maximum allowable time passes or convergence happens. The process may converge if either of the following conditions satisfies: i) all streams are decoded successfully ii) size of the subset of streams to be decoded and their decoding order is identical in two consecutive iterations.

As illustrated, components with similar functionality may be repeated for different iterations and configured to operate on different numbers of streams. For example, components 414 and 420 operate to subtract multiple streams, while 408 subtracts a single stream. In a given iteration, the process may subtract as many streams as successfully decoded up to that iteration. Blocks 410, 416, and 422 may perform similar MMSE operations as block 404, but on different streams. Similarly, Blocks 412, 418, and 424 may perform similar decoding operations as block 406, but on different streams.

The order in which different streams are decoded may have an impact on the performance of a system. Therefore, in an effort to improve system performance, in accordance with certain aspects of the present disclosure, a decoding order may be determined dynamically as a function of current channel conditions and scheduled data rates for each stream.

The need for determining a decoding order dynamically may also be motivated by the fading nature of wireless channels. In wireless standards such as the downlink operation of HSPA+, a receiver terminal reports data rates that may be supported on each stream through a channel quality indicator (CQI) message to the transmitter. However, there may be an uncertain time-delay between transmission of the CQI from the receiver and transmission of a signal from the transmitter. The channel conditions between the transmitter and the receiver may change between the time a CQI message is sent and the time that the transmitter transmits a stream. On the other hand, the scheduler in the transmitter may not schedule the data rates as requested by the receiver.

In general, the transmitter determines and schedules the coding rates for each stream of data based on the information available at the transmitter. After receiving a signal, the receiver selects a decoding order for different streams of data. The receiver may use a pre-selected decoding order for all the incoming packets. Or, the receiver may select the decoding order dynamically. A decoding order selection algorithm that dynamically adapts to the channel conditions and the scheduled rates for all the streams of data, and other parameters may maximize the probability of successful decoding.

The present disclosure presents a few algorithms for determining an optimal decoding order and calculating a reconstruction weight vector.

Figure 5:
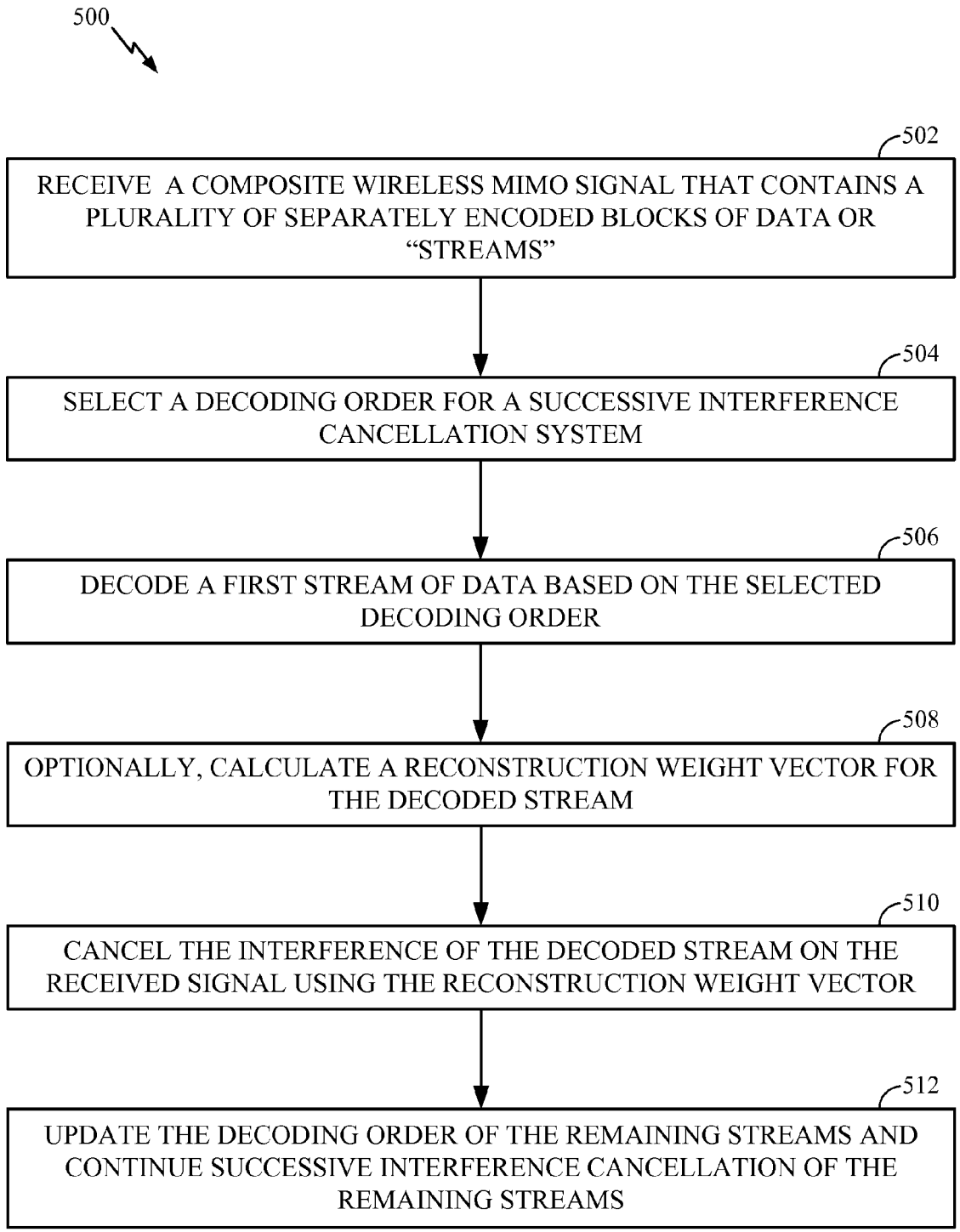
FIG. 5 illustrates example operations for determining decoding order in a MIMO system with successive interference cancellation, in accordance with certain aspects of the present disclosure.

FIG. 5 illustrates example operations for dynamically determining a decoding order and reconstruction weights in a MIMO system with successive interference cancellation, in accordance with certain aspects of the present disclosure. At 502, a receiver receives a composite wireless MIMO signal that contains a plurality of streams. At 504, the receiver selects a decoding order for successive interference cancellation. At 506, the receiver decodes a first stream of data based on the selected decoding order. At 508, the receiver may calculate a reconstruction weight vector for the decoded stream. At 510, the receiver cancels the interference of the decoded stream on the received composite signal, using the reconstruction weight vector. At 512, the receiver updates the decoding order of the remaining streams and continues successive interference cancellation of the rest of the streams. The receiver may dynamically change the decoding order of the remaining streams after each successful decode and subtract operation.

Figure 6:
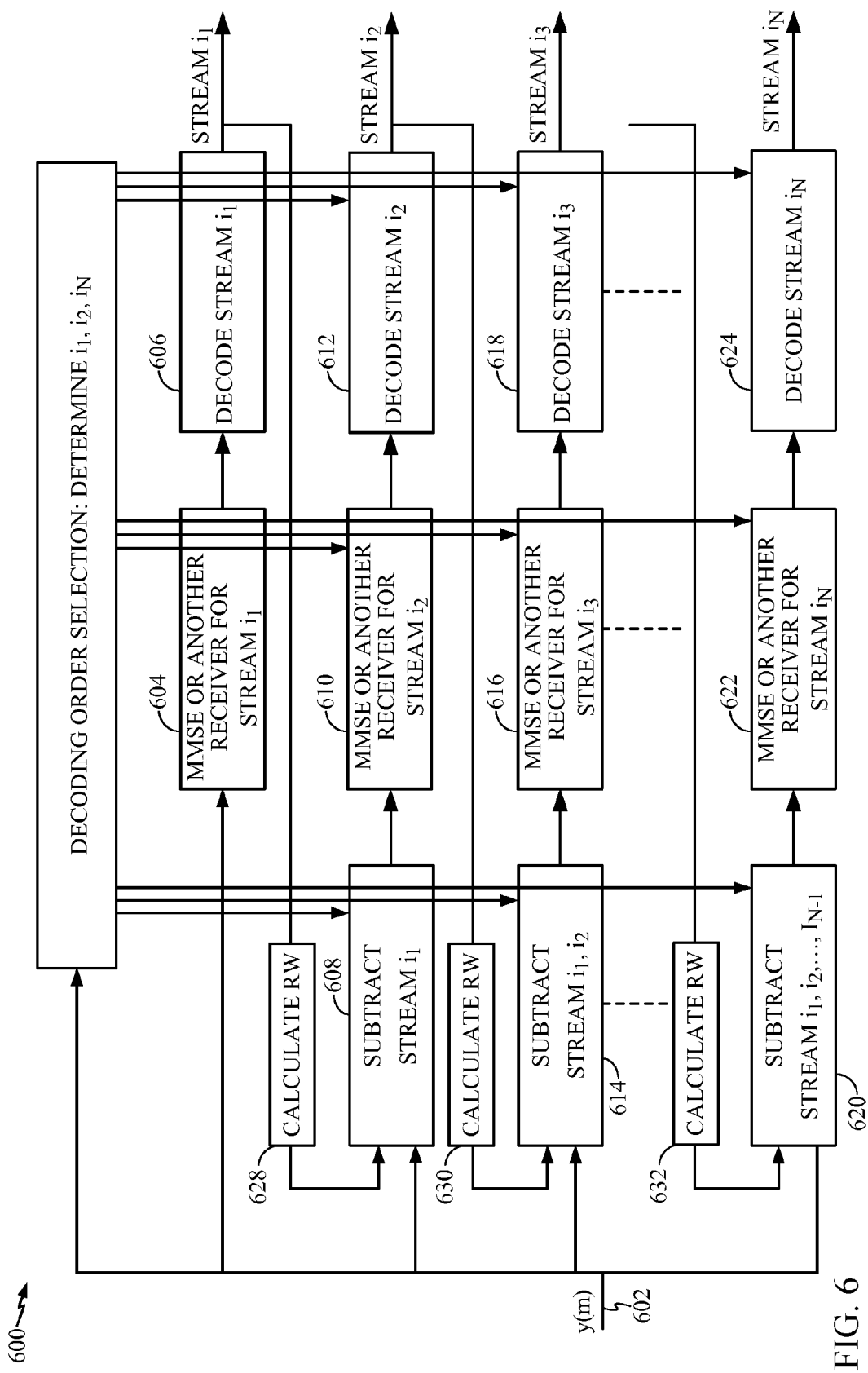
FIG. 6 illustrates an example successive interference cancellation with decoding order selection and reconstruction weight vector calculation, in accordance with certain aspects of the present disclosure.

FIG. 6 illustrates an SIC architecture with the proposed dynamic selection of the decoding order and calculation of reconstruction weights, in accordance with certain aspects of the present disclosure. The decoding order selector (DOS) 626 dynamically determines the decoding order of the streams to maximize the decoding performance subsequent to each SIC iteration. The DOS calculates the probability of successful decoding or the expected throughput of every possible decoding order and selects the decoding order that minimizes the probability of decoding failure and maximizes the throughput.

As illustrated in FIG. 6, a composite received signal y(m) 602 enters a SIC system 600 with decoding order selection and reconstruction weight calculation. The composite received signal y(m) consists of a plurality of separately encoded streams of data. The decoding order selector 626 determines a decoding order for the N streams of data based on the received SNR of each and the required SNR at the input of each decoder. Based on the selected order, the streams are decoded and subtracted from the received signal.

The received signal y(m) passes through a receiver 604 for estimation and detection of the received symbols of a first stream of data. The receiver 604 may comprise a minimum mean square error (MMSE) or any general linear or non-linear estimator/detector. The detected symbols of the first stream enter the channel decoder 606 for decoding. The decoded stream is re-encoded and re-modulated to reconstruct the first stream. The scale of this reconstructed stream may differ from the scale of the first transmitted stream or the scale of first stream in the received composite signal A reconstruction weight vector is calculated at 628 for the reconstructed stream. Blocks 628, 630 and 632 may calculate reconstruction weights for each decoded stream to cancel the interference of the decoded stream from the composite received signal as efficiently as possible. Weight reconstruction, in accordance with certain aspects, is described in greater detail below.

In 608, the reconstructed stream is multiplied with the reconstruction weight vector and subtracted from the received signal. The resulting signal passes through a second receiver 610 and a second decoder 612 to detect and decode the second stream, respectively.

After decoding, effects of both of the first and second streams of data are subtracted at 614 from the received signal to cancel the interference and condition the received signal to enter the third decoding block 618 for decoding the third stream. The process continues with subtraction 620, receiver operation 622 and decoding 624 until all the streams are decoded. The decoders 606, 612 and 618 may use any kind of error correcting code such as turbo codes. The decoders 606, 612 and 618 may decode a plurality of encoded streams with a plurality of types and code rates. The subtraction operation may not be performed if the decoding operation fails at any step. The decoding order selector may update the decoding order of the remaining streams after each successful decode and subtract operation (i.e., each SIC iteration).

As illustrated, components with similar functionality may be repeated for different iterations and configured to operate on different numbers of streams. For example, components 614 and 620 operate to subtract multiple streams, while 608 subtracts a single stream. Blocks 610, 616, and 622 may perform similar MMSE operations as block 604, but on different streams. Similarly, Blocks 612, 618, and 624 may perform similar decoding operations as block 606, but on different streams.

Certain aspects of the present disclosure determine a decoding order based on the signal to noise ratio (SNR) of the received signal and the required SNR in each decoding path for successful decoding. The receiver calculates the required SNR (i.e., $SNR_{required}$) to be able to decode a stream successfully by considering the modulation scheme, channel coding type (e.g., turbo coding in HSDPA standard) and the coding rate of the stream.

The receiver estimates the available signal-to-noise ratio ($SNR_{available}$), for each stream at the input of the decoder blocks, without SIC operation. This information may be derived from channel statistics, such as channel impulse response, flat channel estimate and noise covariance estimate. For certain aspects of the present disclosure, the available signal to noise ratio may also be estimated from the statistics of the output of the MMSE receiver (e.g., the average or the level of energy of the signal). The streams of data may then be ordered with respect to the following equation:

$$SNR_{margin} = SNR_{available} - SNR_{required}$$

The streams may be decoded in the order of decreasing $SNR_{margin}$ so that a stream with the highest $SNR_{margin}$ is decoded first. After each successful decode and subtract operation, $SNR_{available}$ for the remaining streams may be updated to reflect the impact of the subtracted stream. This may change the ordering based on the $SNR_{margin}$, because each stream may have a different amount of interference from the remaining other streams.

It should be noted that all of the SNR values in the above equation are measured in units of dB. The SNR in linear domain are converted to dB domain by the function $f(x) = 10 * \log_{10}(x)$.

Figure 7:
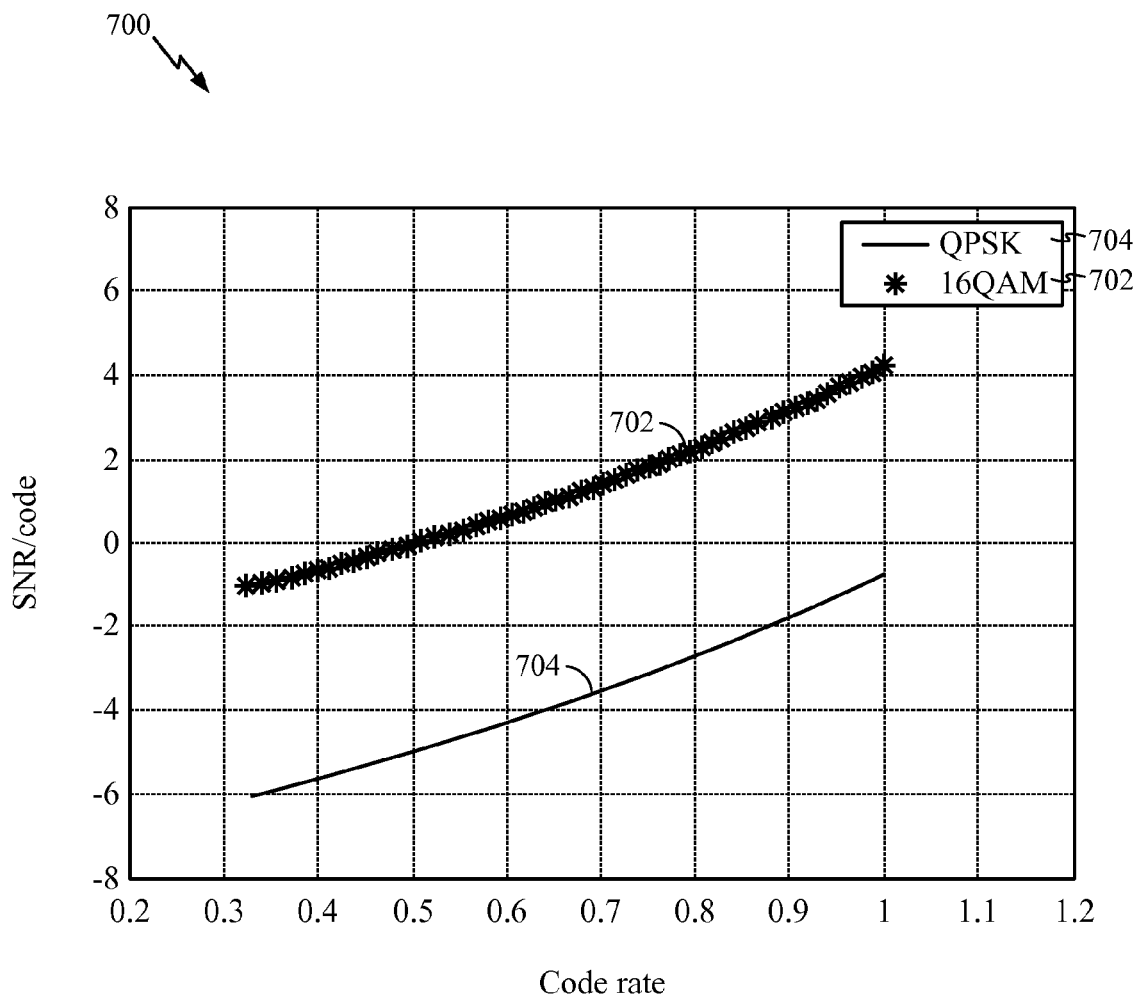
FIG. 7 illustrates an example mapping of the required signal to noise ratio (SNR) for a decoder based on the code rate and modulation scheme, in accordance with certain aspects of the present disclosure.

FIG. 7 illustrates an example mapping of the required SNR for successful decoding of a stream of data based on the code rate and modulation scheme, in accordance with certain aspects of the present disclosure. In this figure, 'Required SNR/code' vs. code rate is illustrated for two systems utilizing 16 QAM (Quadrature Amplitude Modulation) 702 and Quadrature Phase Shift Keying (QPSK) 704 modulation schemes.

In wireless standards, such as HSDPA and LTE, Hybrid Automatic Repeat Request (HARQ) technique may be employed to reduce errors at the Physical Layer. In a system utilizing HARQ, a receiving terminal may send a feedback message to the transmitting terminal to notify the transmitter of failed decoding. Upon receiving the feedback message, the transmitter may transmit a separately-encoded version of the same data stream to the receiver to increase the probability of successful decoding of the stream. The receiver may combine the two versions of the received stream from two separate transmissions and decode the combined stream. If the new version transmits the same bits as the previous version, the HARQ entity is utilizing the Chase combining technique. If the new version transmits different bits by employing a different rate matching (puncturing) pattern, the combining technique is called Incremental Redundancy (IR), which results in a smaller effective code rate of the stream. Both Chase combining and incremental redundancy result in performance gain.

Certain aspects of the present disclosure determine the decoding order based on the highest accumulated $SNR_{margin}$. The accumulated $SNR_{margin}$ includes the effective SNR ratio of a stream after retransmissions in a system utilizing HARQ. The available SNR at the beginning of each decoder unit may be modified in order to consider the earlier transmissions in the system employing HARQ.

If a stream is transmitted r times, in the case of Chase combining, the resulting $SNR_{accumulated}$ may represent the summation of all the available SNR values in the linear domain for all the retransmissions of the stream. The value of $SNR_{accumulated}$ may be calculated as follows:

$$SNR_{accumulated} = 10 \log_{10} [\sigma^r_{i-1} 10^{(SNR_{available}(i)/10)}].$$

It is assumed that $SNR_{available}$ is in units of dB. The above formula adds the signal to noise ratios in the linear domain and converts them back to dB.

The SNR values are accumulated in the linear domain, because the sum of the linear SNR values provides a lower bound on the performance. In general (i.e., including the case of incremental redundancy), the above formula for $SNR_{accumulated}$ provides a pessimistic estimate of the effective SNR after HARQ combining is performed on the signal.

For a system utilizing the HARQ technique, value of the $SNR_{margin}$ may be calculated from the $SNR_{accumulated}$ for each stream instead of $SNR_{available}$. It should be noted that the number of times a stream is retransmitted may be different from stream to stream. Therefore, $SNR_{accumulated}$ for each stream should be calculated based on its corresponding number of retransmissions.

For certain aspects of the present disclosure, the marginal accumulated signal to noise ratio $SNR_{accumulated\_margin}$ may be defined as follows:

$$SNR_{accumulated\_margin} = SNR_{accumulated} - SNR_{required}$$

The received streams may be ordered based on $SNR_{accumulated\_margin}$ and the stream with highest $SNR_{accumulated\_margin}$ may be decoded first. Similarly, $SNR_{accumulated\_margin}$ may be updated after each decode and subtract operation, because $SNR_{accumulated}$ for each stream changes after each iteration. The value of the $SNR_{required}$ is determined based on the code rate and modulation scheme used in the system. The decoder may for example be a convolutional or turbo decoder (i.e., such as in HSPA+). Because puncturing patterns are different for different decoders and for different code rates of a single decoder, some code rates may result in irregularities in the otherwise quasi-linear mapping functions for calculating the SNR (in dB) from the code rate. These practical decoder imperfections may be taken into account with the SNR-based techniques by using the actual mapping functions (e.g., in the form of Look Up Tables).

For certain aspects of the present disclosure, the decoding order may be selected in an effort to increase the accumulated throughput. In this technique, the expected sum-rate (i.e., throughput) for each ordering possibility may be estimated. The order that maximizes sum of the throughputs may be selected. While estimating the sum-rate, intermediate quantities such as SNR may be calculated, or a look up table may be employed.

Certain aspects of the present disclosure determine the decoding order based on the mutual information between the transmitted and received signals. In this technique, a constrained capacity or mutual information (MI) between transmitted and received signals may be calculated (i.e., $MI_{available}$). The value of $MI_{available}$ may be accumulated for different retransmissions of a stream in a HARQ system. The streams may be ordered based on the value of $MI_{margin}$ as follows:

$$MI_{margin} = (\Sigma MI_{available}) - R.$$

where R represents the information rate. The above technique based on the mutual information does not take decoder imperfections into account.

For certain aspects of the present disclosure, SNR-based techniques may model the first transmission of signals accurately, but may model a system utilizing HARQ techniques less accurately. The techniques based on the mutual information model the systems utilizing HARQ more accurately, but are unable to model the first transmission accurately. However, accurate modeling of the first transmission is more important, because the percentage of the signals received correctly through one transmission is much higher than the percentage of signals requiring several transmissions through the HARQ technique. As a result, techniques that select the decoding order based on the SNR are more practical.

For certain aspects of the present disclosure, a reconstruction weight vector may be calculated for each stream of data in order to cancel the interference of the stream from the received composite signal vector. The proposed technique may be utilized in various wireless standards.

The following model at the data symbol level for a MIMO system is considered for a received signal. It should be noted that all quantities in the following equation have complex values and may be indexed by time t, $0 \leq t < T$ to represent a stream of data of length T.

$$y = H \cdot s + n$$

where $y = [y_1 \ldots y_N]^T$ may be an N-dimensional received vector of samples, H may represent a symbol-level N×N matrix that models the effects of the pre-coder such as beam-forming matrix in WCDMA, power scaling, channel, and a complete front-end receiver processing, such as Rake receiver and equalizer on transmitted modulated symbols. In the equation above, $s = [s_1 \ldots s_N]^T$ may represent the N-dimensional vector of coded and modulated symbols transmitted on each stream $s_i$, and n is an additive N-dimensional noise vector that is independent for each s.

When the $i^{th}$ stream is decoded, $\hat{s}_i$ may represent the reconstructed (i.e., re-encoded, rate-matched and re-modulated) complex symbols, with a similar scaling convention as $s_i$. If the block of data in stream $s_i$ is decoded successfully (i.e., a valid cyclic redundancy check (CRC)), values of the $\hat{s}_i$ may be equal to the values of stream $s_i$. Otherwise, if the SNR is not very low, values of $\hat{s}_i$ may be a close approximation of $s_i$. The SIC technique removes the interference of $i^{th}$ stream from the received signal. Therefore, the signal after each iteration of SIC may be written as follows:

$$y' = y - W_i \cdot \hat{s}_i$$

where $W_i$ is the reconstruction weight vector. Note that in each iteration of interference cancellation, y' is updated to remove the interference of each stream from the received signal (for N>2).

Certain aspects of the present disclosure determine the reconstruction weight of each stream using a pilot signal and the amplitude of the received signal. In a wireless communication system, a pilot signal is used to estimate channel properties. The pilot is subject to the noise and interference from the MIMO channel in addition to the receiver front-end processing. Therefore, by factoring out a known pre-coder matrix, a scaled estimate of H may be derived from the pilot signal with the following equation:

$$\hat{H} = \alpha \cdot \hat{H}p$$

where $\hat{H}_p$ is a pilot-based estimate of the channel and $\alpha$ is a constant during each scheduling interval for the data streams.

The parameter $\alpha$ is closely related to the data traffic to pilot ratio and may be calculated based on the modulation type of the one-dimensional complex symbol-level stream $s_i$ and its symbol amplitude before decoding, assuming certain properties for the noise component.

The reconstruction weight vector $W_i$ for cancellation of stream $s_i$ is the $i^{th}$ column vector of the matrix $A_i = c_i \cdot \hat{H}p$. The parameter $c_i$ is a constant specific to the $i^{th}$ stream that may be calculated based on data-traffic to pilot ratio, modulation scheme, and other parameters of the system for that stream, such as number of CDMA codes in the context of the HSPA+ standard.

If a decoder fails to decode a stream correctly and the demodulator structure involves more than one iteration for a stream (i.e., an iterative SIC), the estimate of the constant $c_i$ becomes more accurate as the interfering streams are cancelled over a plurality of iterations.

The pilot-based technique for calculating the reconstruction weight vector has very low additional complexity, since it utilizes parameters that have previously been estimated in the system for other purposes. For example, the channel estimate $\hat{H}_P$ is calculated for Channel Quality Indicator (CQI) reports and the signal amplitude is estimated for Log Likelihood Ratio mapping prior to decoding.

Certain aspects of the present disclosure utilize a correlation method for determining the reconstruction weight vectors. A reconstruction weight vector may be obtained from the composite received signal by correlating the re-encoded and modulated complex symbols $\hat{s}_i$ with the N-dimensional received vector y.

$$W_i = E[y \cdot \hat{s}_i^*] = (1/T) \Sigma_{t=0 \ldots T-1} [y(t) \cdot \hat{s}_i^*(t)]$$

In the above equation, $W_i$ is the optimal reconstruction vector—in a time invariant system—for the $i^{th}$ stream that is decoded successfully. The superscript * denotes a conjugate operation. The interference of a decoded stream may be cancelled completely by utilizing the optimal correlation-based reconstruction weight vector $W_i$. On the other hand, due to scaling and estimation imperfections, the pilot-based reconstruction weight vectors may not be able to cancel all the interference of the $i^{th}$ stream from the received signal completely.

The correlation-based reconstruction weight vector calculation technique is particularly useful when followed by a Symbol Level Equalizer, which results in significant throughput improvements, especially for large N. However, the benefits come with the drawback of higher complexity in the system through introduction of a correlator block. However, a single correlator may be utilized for a plurality of streams in different time frames.

For certain aspects of the present disclosure, a hybrid technique (i.e., a combination of pilot-based and correlation-based techniques) may be employed in a system to calculate the reconstruction weights of a plurality of streams. The correlation-based technique may be utilized to calculate the reconstruction weights of the first few streams (which are usually the streams with lower SNRs under the dynamic SNR-based order selection), in order to optimally remove the interference of the first few streams on the composite received signal. The pilot-based technique may be utilized in later iterations, to remove the interference of the remaining streams, when there is less interference in the residual composite signal. This hybrid technique may speed up the process of reconstruction weight calculation and may allow further tradeoff flexibility in the overall system.

Figure 5A:
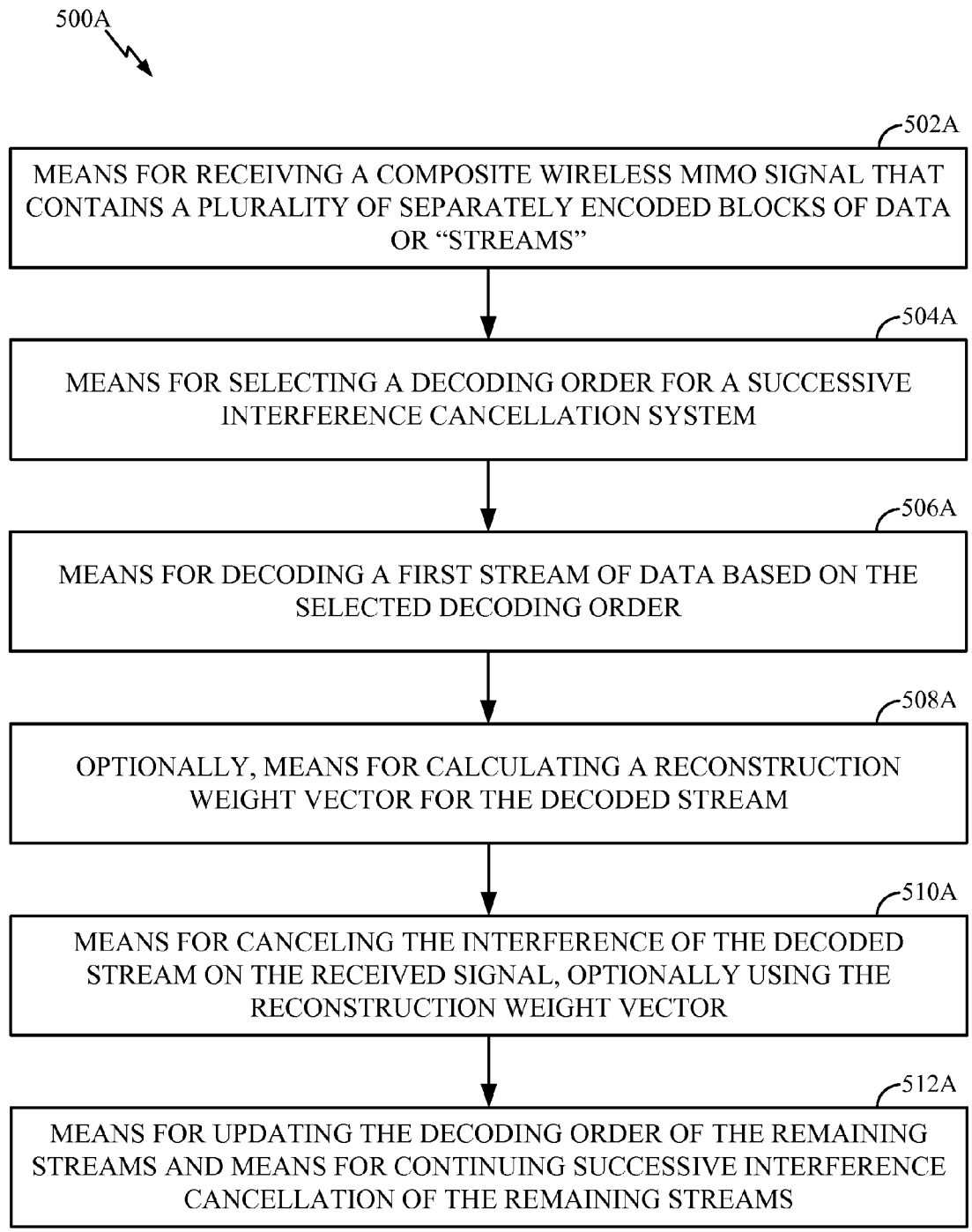
FIG. 5A illustrates example components capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 502-512, illustrated in FIG. 5 correspond to circuit blocks 502A-512A, illustrated in FIG. 5A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that may be known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions may be specified, the order and/or use of specific steps and/or actions may be modified without departing from the scope of the claims.

The functions described may be implemented in hardware, software, firmware or any combination thereof If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software may be transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It may be to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a receiver configured to receive a composite wireless multiple input multiple output (MIMO) signal that comprises a plurality of separately encoded data streams;
   a processor configured to:
   select a decoding order for decoding the data streams using successive interference cancellation;
   decode a first stream of data based on the selected decoding order;
   generate a matrix, based on a channel estimate and a constant related to a traffic to pilot ratio;
   extract a column from the matrix to be a reconstruction weight vector of the decoded stream;
   cancel the interference of the decoded stream from the received signal before decoding remaining streams, based at least in part on the reconstruction weight vector; and
   update the decoding order of the remaining streams and continuing successive interference cancellation of the remaining streams.

2. The apparatus of claim 1, wherein the processor is further configured to:
   determine a required signal-to-noise ratio (SNR) for correct decoding of each of the streams;
   calculate an available SNR for each of the streams;
   subtract the required SNR from the available SNR for each of the streams to obtain an intermediate value; and
   select the decoding order based on decreasing order of the intermediate values of all the streams.

3. The apparatus of claim 2, wherein the required SNR for correct decoding of each of the streams is calculated based on the decoder type, coding rate and the modulation type of the stream.

4. The apparatus of claim 2, wherein the available SNR at the input of each of the decoders is calculated based on the statistics of a channel, wherein the statistics comprise at least one of: channel impulse response, flat channel estimate and noise covariance matrix.

5. The apparatus of claim 2, wherein the available SNR at the input of each of the decoders is calculated based on the statistics of the output of a minimum mean squared error (MMSE) detector.

6. The apparatus of claim 2, wherein the available SNR for each of the streams is calculated by accumulating the available SNR of the plurality of transmissions of the streams in a hybrid automatic repeat request (HARQ) system.

7. The apparatus of claim 6, wherein the available SNRs are accumulated in linear domain.

8. The apparatus of claim 1, wherein the decoding order for the successive interference cancellation is selected in an effort to maximize overall throughput of the system.

9. The apparatus of claim 1, wherein the processor is further configured to:
   calculate a constrained capacity or mutual information between transmitted signals and the received signals;
   accumulate the mutual information for all the transmissions of the signals in a hybrid automatic repeat request (HARQ) system; and
   select the decoding order for the streams based on the accumulated mutual information and the information rate of each of the streams.

10. The apparatus of claim 1, wherein the processor is further configured to:
    reconstruct the decoded stream by re-encoding and re-modulating the decoded stream to obtain a reconstructed stream;
    and
    cancel the interference of the decoded stream on the received composite signal by scaling the reconstructed stream with the reconstruction weight vector and subtracting the result from the composite received signal.

11. An apparatus for wireless communications, comprising:
    a receiver configured to receive a composite wireless multiple input multiple output (MIMO) signal that comprises a plurality of separately encoded data streams;
    a processor configured to: select a decoding order for decoding the data streams using successive interference cancellation;

decode a first stream of data based on the selected decoding order;

cancel the interference of the decoded stream from the received signal before decoding remaining streams;

update the decoding order of the remaining streams and continuing successive interference cancellation of the remaining streams;

reconstruct the decoded stream by re-encoding and re-modulating the decoded stream to obtain a reconstructed stream;

determine a reconstruction weight vector for the decoded stream;

cancel the interference of the decoded stream on the received composite signal by scaling the reconstructed stream with the reconstruction weight vector and subtracting the result from the composite received signal;

estimate the channel properties based on a received pilot signal;

calculate a constant related to a traffic to pilot ratio, based on the characteristics of the stream;

multiply the constant with the estimate of the channel from the pilot signal to generate a matrix; and extract one of the columns of the matrix to be the reconstruction weight vector of the decoded stream.

12. The apparatus of claim 10, wherein the processor is further configured to:

calculate the reconstruction weight vectors for a first plurality of streams with a first technique; and calculate the reconstruction weight vectors for a second plurality of streams with a second technique.

13. The apparatus of claim 12, wherein the first technique calculates the reconstruction weight vector based on correlation of the reconstructed stream with the received composite signal.

14. The apparatus of claim 12, wherein the second technique calculates the reconstruction weight vector based on the statistics of pilot signal, signal amplitude and modulation scheme of the stream.

15. An apparatus for wireless communications, comprising:

a receiver configured to receive a composite wireless multiple input multiple output (MIMO) signal that comprises a plurality of separately encoded data streams;

a decoding order selector configured to select a decoding order for decoding the data streams using successive interference cancellation;

a decoder configured to decode a first stream of data based on the selected decoding order;

a processor configured to generate a matrix based on a channel estimate and a constant related to a traffic to pilot ratio; and extract a column from the matrix to be a reconstruction weight vector of the decoded stream;

a stream subtractor configured to cancel the interference of the decoded stream from the received signal before decoding remaining streams, based at least in part on the reconstruction weight vector; and wherein the decoding order selector is further configured to update the decoding order of the remaining streams and continuing successive interference cancellation of the remaining streams.

16. The apparatus of claim 15, further comprising:

wherein the receiver is further configured to determine a required signal-to-noise ratio (SNR) for correct decoding of each of the streams and calculate an available SNR for each of the streams; and wherein the decoding order selector is further configured to subtract the required SNR from the available SNR for each of the streams to obtain an intermediate value and select the decoding order based on decreasing order of the intermediate values of all the streams.

17. The apparatus of claim 16, wherein the required SNR for correct decoding of each of the streams is calculated based on the decoder type, coding rate and the modulation type of the stream.

18. The apparatus of claim 16, wherein the available SNR at the input of each of the decoders is calculated based on the statistics of a channel, wherein the statistics comprise at least one of: channel impulse response, flat channel estimate and noise covariance matrix.

19. The apparatus of claim 16, wherein the available SNR at the input of each of the decoders is calculated based on the statistics of the output of a minimum mean squared error (MMSE) detector.

* * * * *